(12) United States Patent
Dressler et al.

(10) Patent No.: US 9,151,926 B2
(45) Date of Patent: Oct. 6, 2015

(54) ADJUSTABLE LENS MOUNT FOR A STRIP LENS

(71) Applicant: JENOPTIK OPTICAL SYSTEMS GMBH, Jena (DE)

(72) Inventors: Thomas Dressler, Jena (DE); Elke Eichler, Jena (DE)

(73) Assignee: JENOPTIK OPTICAL SYSTEMS GMBH, Jena (DE)

( * ) Notice: Subject to any disclaimer, the term of this patent is extended or adjusted under 35 U.S.C. 154(b) by 199 days.

(21) Appl. No.: 13/937,775

(22) Filed: Jul. 9, 2013

(65) Prior Publication Data

US 2013/0293973 A1 Nov. 7, 2013

Related U.S. Application Data

(63) Continuation of application No. PCT/DE2012/100033, filed on Feb. 14, 2012.

(30) Foreign Application Priority Data

Mar. 1, 2011 (DE) .......................... 10 2011 012 886

(51) Int. Cl.
*G02B 7/02* (2006.01)
*G02B 26/12* (2006.01)
*G02B 27/00* (2006.01)

(52) U.S. Cl.
CPC .............. *G02B 7/023* (2013.01); *G02B 26/125* (2013.01); *G02B 26/127* (2013.01); *G02B 27/0031* (2013.01)

(58) Field of Classification Search
CPC .. G06K 7/10881; G02B 26/10; G02B 27/095; G02B 24/0966; G02B 7/003; G02B 7/02; G02B 27/0966; B23K 26/0648; A61F 2009/0087; A61F 2009/00897; H04N 1/1135; H04N 5/2254; H04N 2201/0056; H04N 2201/0063; G03G 21/1647; A61B 1/00096; A61B 1/00172; A61B 5/0062; Y10T 436/10; Y10T 436/115831; Y10T 436/12; Y10T 436/25; Y10T 436/25375; Y10T 436/255; Y10T 436/2575
USPC ........................................ 359/819, 822, 222.1
See application file for complete search history.

(56) References Cited

U.S. PATENT DOCUMENTS 4,496,209 A 1/1985 Itoh et al.
(Continued)

FOREIGN PATENT DOCUMENTS

EP 1 780 566 A1 5/2007
EP 2 017 664 A2 1/2009

*Primary Examiner* — Alicia M Harrington
(74) *Attorney, Agent, or Firm* — Muncy, Geissler, Olds & Lowe, P.C.

(57) ABSTRACT

A lens mount for a strip lens is provided, in which the strip lens can be deformed substantially perpendicular to its optical axis, in order to linearize the imaging of a beam scanning over the strip lens. The lens mount includes a slotted distance strip, a support strip and a base plate. The support strip is rigidly connected to the strip lens via the distance strip that has only a very low bending stiffness and can be deformed relative to the base plate by means of adjusting screws, whereby the strip lens can be deformed. By inserting a distance strip, the installation space that is required for the lens mount is essentially moved away from the optical axis in order to provide, for example, installation space for adjacent optical or mechanical components.

10 Claims, 3 Drawing Sheets

(56) References Cited

U.S. PATENT DOCUMENTS

| | | |
|---|---|---|
| 2004/0125193 A1 | 7/2004 | Kubo |
| 2006/0132880 A1 | 6/2006 | Amada et al. |
| 2006/0232844 A1 | 10/2006 | Nakajima |
| 2006/0238845 A1 | 10/2006 | Atsuumi et al. |
| 2007/0253047 A1 | 11/2007 | Ichii et al. |
| 2008/0212155 A1 | 9/2008 | Shoji |

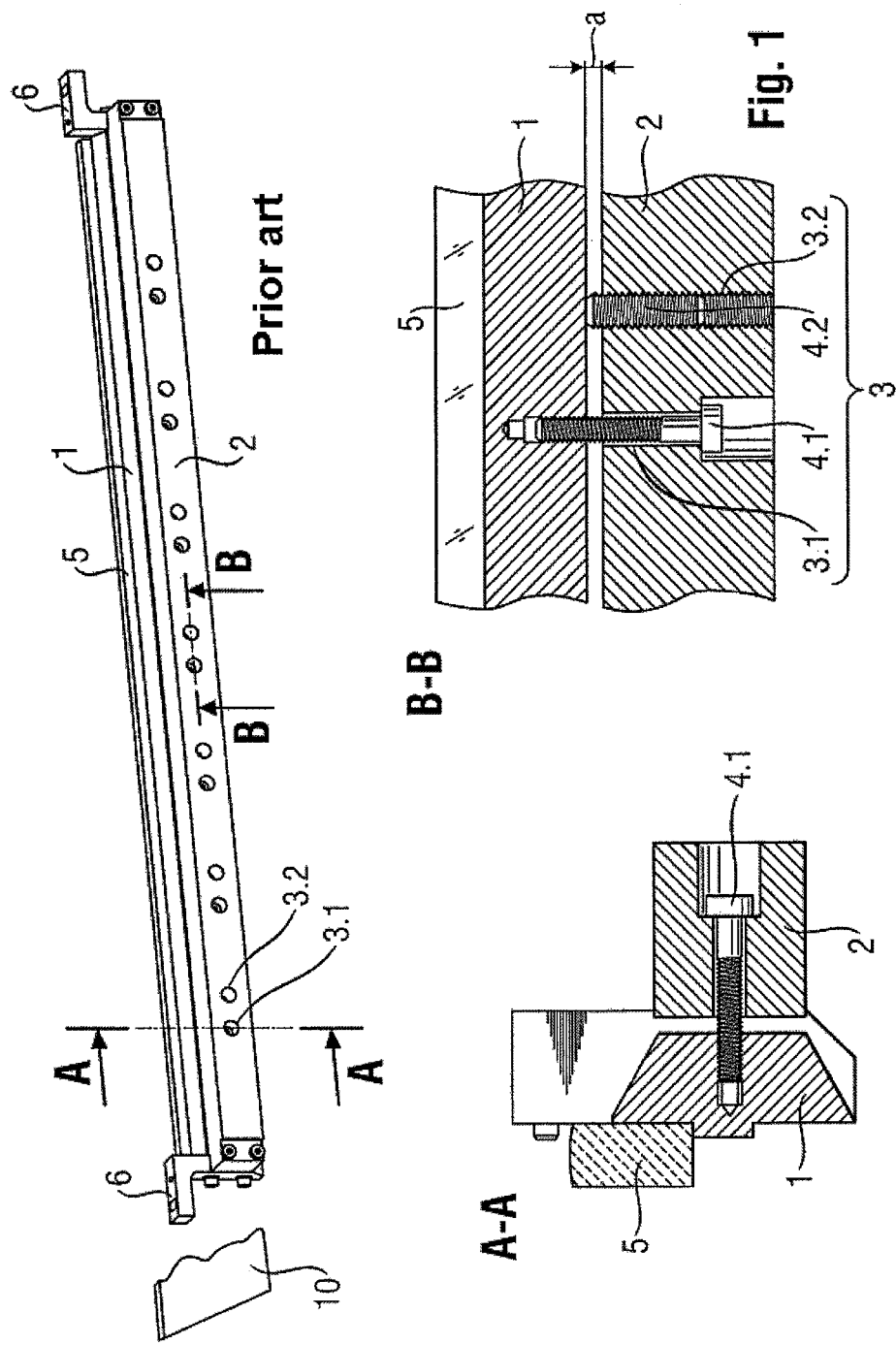

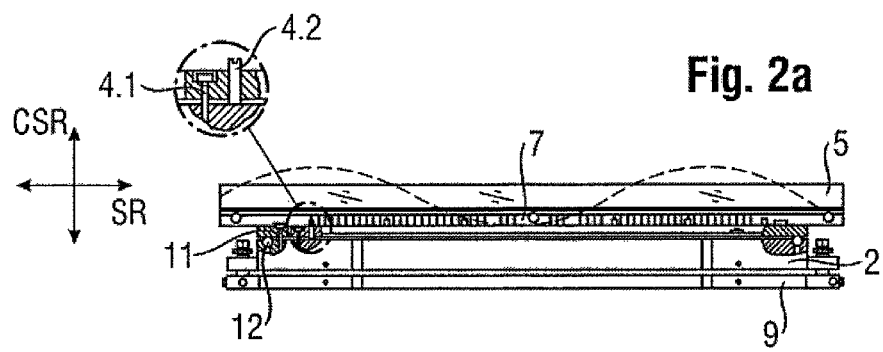
Fig. 2a
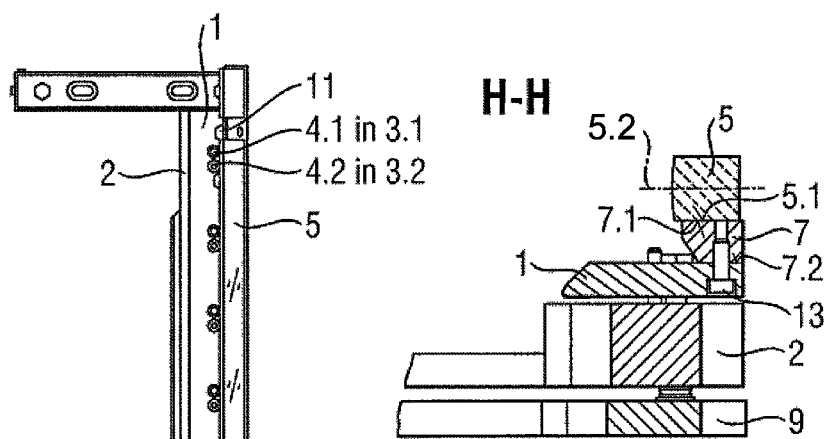
Fig. 2b
Fig. 2c
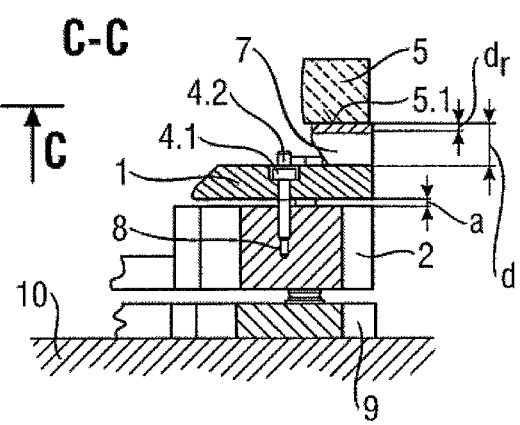
Fig. 2d

ADJUSTABLE LENS MOUNT FOR A STRIP LENS

This nonprovisional application is a continuation of International Application No. PCT/DE2012/100033, which was filed on Feb. 14, 2012, and which claims priority to German Patent Application No. DE 10 2011 012 886.7, which was filed in Germany on Mar. 1, 2011, and which are both herein incorporated by reference.

BACKGROUND OF THE INVENTION

1. Field of the Invention

The invention relates to an adjustable lens mount for a strip lens, in particular in the form of a long, thin cylindrical lens, as used in scan objective lenses in laser material processing and in the printing industry.

2. Description of the Background Art

The strip lens generally forms the last optical imaging element within an optical arrangement, which focuses the laser beam that passes over the strip lens in a scanning fashion in the direction of the longitudinal extent thereof (scan direction) in an image plane, in which the workpiece to be processed is arranged.

The scan line described by the focus on the workpiece theoretically is a straight line in this case; however, in practice, it deviates from an ideal straight line in the direction of the relative motion between the scan line and the workpiece (cross-scan direction), perpendicular to the scan direction, as a result of tolerances of the components involved in the imaging. In order to keep these deviations within a tolerance limit, it is known to deform the strip lens over the longitudinal extent thereof perpendicular to the optical axis thereof by applying forces at points and thereby linearize the scan line.

Compared to conventional rotationally symmetric lenses, a cylindrical lens is distinguished in term of its design by virtue of the fact that it has an unchanging cross section perpendicular to the longitudinal extent thereof over the whole length thereof and therefore has a constant thickness (extent in the direction of the optical axis). Provided that it is comparatively long and thin, this peculiarity makes it predestined to manipulate the beam imaging in order to linearize the scan line described by the focus by an adjustment via a targeted local deformation in the sub-micrometer range which can be effected with an equally long travel at each point along the length.

In order to provide mechanical stability to a long and thin strip lens, it is conventional for the strip lens to be cohesively applied to a support strip along a joining area, even before the final treatment of its optically active surface. The support strip then remains permanently connected to the strip lens.

In order to enable a deformability of the strip lens, the support strip must be correspondingly deformable with the available adjustment forces or adjustment paths; this is achieved by selecting a flexural strength of the support strip optimized for this, by the choice of material with a suitable Young's modulus and a geometric moment of inertia of the support strip correlated thereto, which is determined by the dimensions thereof, more particularly the thickness.

In accordance with the conventional art, such a support strip is designed to be wider than the required joining area is wide, by means of which joining area the strip lens is fixedly connected to the support strip, in order to provide a sufficiently wide assembly surface on the side opposite to the joining area, on which assembly surface a multiplicity of set screws can engage along the longitudinal extent of the support strip in order to affix the latter in adjustable fashion with respect to a rigid mounting plate.

FIG. 1 illustrates a lens mount with strip lens, as known from the prior art. What is shown is a perspective view with a scale of 1:2 and two sectional illustrations (not to scale).

The lens mount essentially has an elongate support strip 1 with a joining area on which a strip lens 5 can be applied over the whole length thereof and a rigid mounting plate 2, which is provided on the free side of the support strip 1 lying opposite to the joining area. The mounting plate 2 is slightly longer than the support strip 1 and, along the length thereof, has a row of alternately arranged recessed through holes 3.1 and end-to-end threaded bores 3.2. At the ends, the support strip 1 and the mounting plate 2 are assembled at a predetermined adjustment spacing from one another on lateral holders 6, by means of which the lens mount can be attached to a reference surface 10, which is for example provided on a housing of a scanning objective lens.

First set screws 4.1, preferably cylinder head screws, are inserted into the through holes 3.1 and engage into provided threaded drill holes (referred to below as bores 8 provided with a thread to facilitate a distinction) at the free outer surface of the support strip 1. Differentiated tightening of individual first set screws 4.1, which can thereby be adjusted by a differentiated travel, renders it possible locally to pull the support strip 1 toward the mounting plate 2 to a greater or lesser extent.

Second set screws 4.2, preferably set screws with ball terminals, are inserted into the end-to-end threaded bores 3.2 and these butt against the free outer surface of the support strip 1. Differentiated tightening of individual second set screws 4.2 renders it possible locally to push the support strip 1 away from the mounting plate 2 to a greater or lesser extent.

By means of targeted manipulation of the first and second set screws 4.1, 4.2, it is possible to deform the support strip 1, and hence the strip lens 5 fixedly connected to the support strip 1, in a wave-shaped fashion in the sub-micrometer range in the cross-scan direction (CSR).

A disadvantage of the above-described lens mount is the installation space required for this directly adjacent to the strip lens 5. In the illustrated section A-A, it is clearly possible to see that the support strip 1 clearly extends beyond the thickness of the strip lens 5 in the direction of the optical axis, which is the same as the cross-scan direction (CSR). As a result, it is not possible to arrange a further optical or mechanical component in this region.

As a result of the usually very short focal lengths of cylindrical lenses, there often is the need to arrange further optical and mechanical components in the vicinity of the cylindrical lens embodied as strip lens 5, which is why it is disadvantageous if the installation space required for the lens mount, which directly adjoins the strip lens 5, extends beyond the thickness of the strip lens 5.

Moreover, the support strip 1 can undesirably restrict the beam path.

In order to ensure an adjustment of the strip lens 5 after the lens mount has been installed in an optical arrangement, the mechanical connection between the mounting plate 2 and a reference surface 10 can only be brought about via lateral holders 6 in order to enable access to the set screws 4.1, 4.2. Such an attachment assumes particularly high flexural strength of the mounting plate 2.

SUMMARY OF THE INVENTION

It is therefore an object of the invention to provide an improved lens mount for a strip lens, which requires less installation space directly adjoining a strip lens held thereby. The requirements in respect of a mounting plate of the lens mount should advantageously be lower in order to able either to make it with less material, leading to a lower weight, or to make it from more cost-effective material.

This object is achieved in an embodiment by an adjustable lens mount for strip lenses, having a support strip, which, by means of one of its longitudinal sides, is connected to an optically non-active longitudinal side of a strip lens to be mounted and a mounting plate, which, with the ends thereof, is arranged at a fixed adjustment spacing a from the ends of the support strip and which, between the ends, is connected to the support strip by first set screws, acting as tension screws, and second set screws, acting as pressure screws, which are arranged alternately in a row, such that the support strip and, as a result, the strip lens can be deformed over its length in the action direction of the first and second set screws and, perpendicular to its optical axis by means of the following features.

The strip lens and the support strip can be interconnected not directly but indirectly via a spacer strip, wherein one longitudinal side of the spacer strip is cohesively connected to the longitudinal side of the strip lens and the opposite longitudinal side of the spacer strip is fixedly connected to the longitudinal side of the support strip. The function of this spacer strip is to displace the installation space required for the components of the lens mount away from the strip lens. In order to keep the forces required for adjusting the set screws and to a minimum, the spacer strip has a flexural strength which is as low as possible but the highest possible compressive strength. So that the spacer strip, which has a pressure resistant material, only has low flexural strength, a multiplicity of slits which are open to the opposite longitudinal side have been introduced therein. These slits extend in the action direction of the set screws over the whole width of the spacer strip, as a result of which the dependence of the flexural strength of the spacer strip is determined by the geometry thereof, by the remaining residual thickness of the slit base remaining below the slits.

The support strip advantageously has alternate through holes and end-to-end threaded bores arranged in a row and the first set screws engage through the through holes into bores, provided with a thread, in the mounting plate while the second set screws butt with pressure against the mounting plate through the threaded bores.

The necessary adjustment spacing is advantageously determined by a three-point bearing.

The support strip and the mounting plate can be interconnected at their ends by a fixed bearing and a loose bearing.

In order to reliably preclude a possible bending of the mounting plate, the mounting plate can, for adjustment purposes, be mounted directly on a reference surface with at least two degrees of freedom. As a result, it can have a thinner design compared to a connection to the reference surface by means of lateral holders.

By virtue of it being possible to mount the mounting plate indirectly onto a reference surface via a base plate, the mounting plate can be adjusted relative to the reference surface by virtue of the base plate advantageously being embodied to be adjusted with two degrees of freedom with respect to the reference surface and the mounting plate being embodied to be adjusted with two further degrees of freedom with respect to the base plate.

In order to modify the lens mount for the installation in different optical arrangements, in which, in particular, the reference surface is provided at a different distance from the strip lens, the thickness of the spacer strip in the case of unchanging residual thickness can be adapted to respectively different provided interfaces.

In order to keep the largest possible installation space near the strip lens free for other optical or mechanical components, the width of the spacer strip can be less than the height of the strip lens.

A further enlargement of this installation space is brought about if the width of the spacer strip is decreasing from the slit base and/or if the support strip and the spacer strip are screwed flush to one another on one side.

In an embodiment, a spacer strip is provided between a deformable support strip and a strip lens, which spacer strip has the lowest possible flexural strength. The function of this spacer strip is to fixedly interconnect the strip lens and the support strip in order to transmit a deformation of the support strip onto the strip lens. Depending on the thickness of the spacer strip, the installation space required for the lens mount is to the largest possible extent moved away from the optical axis such that space is created here for arranging other mounted optical components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a lens mount according to the prior art;

FIGS. 2a-2d show a lens mount according to an embodiment of the invention; and

DETAILED DESCRIPTION

Figure 3:
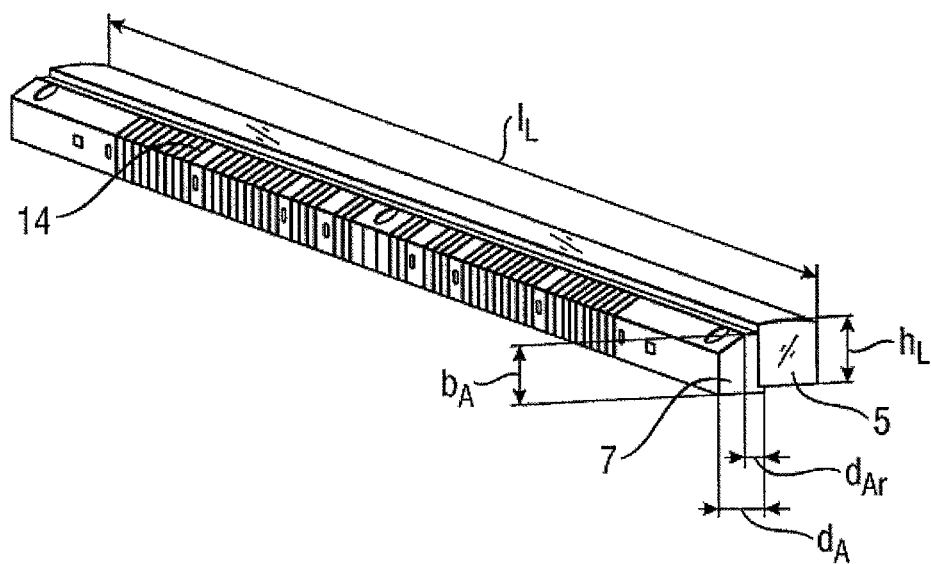
FIG. 3 shows a spacer strip with a strip lens according to an embodiment according to FIG. 2.

The lens mount illustrated in FIG. 1 relates to a lens mount as known from the prior art and as has already been described in detail in the description of the prior art.

FIG. 2 illustrates an embodiment of a lens mount according to the invention in a front view, with a magnified section in a top view and in two sectional images. The front view and the top view were drawn true to scale with a scale of 1.5:1 in order to impart an idea of the phrase "long and thin" strip lens.

A lens mount according to the invention is designed in such a way that a mounted strip lens, which is scanned by a laser beam in the longitudinal direction (which is the same as the scan direction (SR)) and therefore describes a scan line which can locally be deformed perpendicularly to the scan direction SR (in the cross-scan direction CSR) in order to linearize the scan line.

The lens mount with a mounted strip lens 5 substantially comprises a strip lens 5, a spacer strip 7, a support strip 1, a mounting plate 2 and a base plate 9, as well as set screws 4.1 and 4.2, by means of which the support strip 1, and hence the spacer strip 7 and the strip lens 5, can be deformed with respect to the mounting plate 2.

FIG. 2 shows the spacer strip 7—in more detail.

By means of one of its optically non-active longitudinal sides 5.1, the strip lens 5 is cohesively connected, more particularly adhesively bonded, to a longitudinal side of the spacer strip 7.1.

The length of the spacer strip 7 is at least approximately the same as the length of the strip lens $I_L$, so that the spacer strip can transmit bending forces acting thereon onto the whole length $I_L$ of the strip lens 5. The thickness $d_A$ can be varied and can be selected depending on the distance at which an optical axis 5.2 of the strip lens should extend with respect to a reference surface 10 on which the lens mount is assembled upon integration into an optical arrangement or on how much space is required near the strip lens 5 for components arranged next to it.

In contrast to this, this distance can be varied by the length of lateral holders 6 in the described prior art, by means of which lateral holders the lens mount can be assembled on a reference surface 10. As a result, unlike what is advantageously possible for a lens mount depicted here, a lens mount according to the prior art cannot be assembled on the reference surface 10 directly over the base plate 9 or, in another embodiment, directly over the mounting plate 2, which is of importance for the dimensioning of the mounting plate 2 and optionally of the base plate 9. Explanations in this respect are provided below.

The thickness of the spacer strip $d_A$ is preferably less than the height of the strip lens $h_L$, wherein a sufficiently wide joining area must be provided for connecting the strip lens 5 to the spacer strip 7 in a stable and mechanically fixed fashion. Starting just behind the joining area, the width of the spacer strip $b_A$ preferably decreases. An optimization of the dimensions of the spacer strip 7 with a minimal thickness $d_A$, a decreasing width $b_A$ and ultimately a greater thickness $d_A$ lead to the desired effect of having free space in a region near the strip lens 5 for being able to arrange adjacent components.

So that acting bending forces can be transmitted onto the strip lens 5 without a significant resistance, the spacer strip 7 has a flexural strength that is as low as possible, but has a high compressive strength. In particular, the low flexural strength is achieved by virtue of the spacer strip 7 having a design with slits. The slits 14 are distributed over nearly the whole length of the spacer strip 7 and are preferably only spaced apart with a relatively large distance where provision is made for bores 8 provided with a thread for the purpose of connection to the support strip 1. The slits 14 are open toward a longitudinal side 7.2 opposite to the longitudinal side 7.1 and extend over the whole width $b_A$ thereof. The material remaining below the slits 14, referred to as slit base below, has a constant residual thickness $d_{Ar}$, which is selected to be as small as possible.

Since the dependence of the flexural strength on the dimensions is substantially given by the thickness in the direction of an acting bending force, it is not the thickness of the spacer strip $d_A$ but rather the residual thickness $d_{Ar}$ which is decisive for the flexural strength of the spacer strip 7. The smaller the residual thickness $d_{Ar}$ is, the lower the flexural strength thereof. As a result, the thickness of the spacer strip $d_A$ can be varied while maintaining the residual thickness $d_{Ar}$, without this changing the flexural strength of the spacer strip 7.

The spacer strip 7 assumes part of the function of a support strip 1 as per the lens mount known from the prior art, namely holding and stabilizing the strip lens 5 within the lens mount and also already during the preceding manufacturing.

The support strip 1 is assembled on the spacer strip 1, for example, by multiple screw connections using fixing screws 13.

The support strip 1 can be designed to have a flexural strength that allows a deformation by adjusting the set screws 4.1, 4.2 as a result of the material selection and the dimensioning thereof, in particular the thickness thereof.

It can have a design that is slightly shorter than the spacer strip 7 in order thereby to grant assembly freedom for attaching the mounting plate 2 to a reference surface 10.

At the ends thereof, the support strip 1 and the mounting plate 2 are, by means of fixing screws 11, connected to one another at an adjustment spacing a via a fixed bearing and a loose bearing. The adjustment spacing a is preferably ensured by a three-point bearing which can, for example, be spanned by balls 12.

Over its length between the two bearings, the support strip 1 has a row of alternately arranged recessed through holes 3.1 and end-to-end threaded bores 3.2. First set screws 4.1, preferably cylinder head screws, are inserted into the through holes 3.1 and engage into threaded drill holes (referred to below as bores 8 provided with a thread to facilitate a distinction) provided on an outer surface of the mounting plate 2. Differentiated tightening of individual first set screws 4.1 renders it possible locally to pull the support strip 1 toward the mounting plate 2 to a greater or lesser extent.

Second set screws 4.2, preferably set screws with ball terminals, are inserted into the threaded bores 3.2 and these butt against the same outer surface. Tightening or loosening these second set screws 4.2 pushes the support strip 1 away from the mounting plate 2 to a greater or lesser extent.

By means of targeted manipulation of the first and second set screws 4.1, 4.2, it is possible to deform the support strip 1, and hence the strip lens 5 fixedly connected to the support strip 1 via the spacer strip 7, in the sub-micrometer range.

The mounting plate 2 is very rigid and so the travel of the set screws 4.1, 4.2 completely goes into the deformation of the support strip 1.

In order to bring the mounting plate 2 into a defined position with respect to a reference surface 10, it could be possible for the mounting plate 2, as is also known from the prior art, to be assembled on the reference surface 10 by means of two lateral holders 6. However, affixing the mounting plate 2 directly to the reference surface 10 is mechanically more stable and shortens the tolerance chain between mounting plate 2 and reference surface 10.

The mounting plate 2 can also be attached indirectly by means of a base plate 9 which is arranged between the mounting plate 2 and the reference surface 10. An advantage of this is that the mounting plate 2 is then adjusted with respect to the reference surface 10 not only by displacing and tilting the mounting plate 2, but rather this adjustment is divided between the mounting plate 2 and the base plate 9. The base plate 9 can then be assembled on the reference surface 10 in such a way that, during assembly, it can be adjusted with two degrees of freedom, namely in two axial directions: in the direction of the optical axis 5.2 and perpendicular thereto. After fixing the base plate 9 in the adjusted position, the mounting plate 2 is thereupon also adjusted with two degrees of freedom in an axial direction perpendicular thereto and around the axial direction perpendicular to the optical axis 5.2. As a result of this adjustment, the strip lens 5 is, in terms of its position, positioned with respect to the remaining optical components of the optical arrangement.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjustable lens mount for a strip lens, the mount comprising:
   a support strip, which, via one of its longitudinal sides, is connected to an optically non-active longitudinal side of a strip lens to be mounted; and
   a mounting plate, which, with ends thereof, is arranged at a fixed adjustment spacing from the ends of the support strip and affixed to the support strip by locking screws, the mounting plate, between the ends, is connected to the support strip by first set screws acting as tension screws and second set screws acting as pressure screws, which are arranged alternately in a row, such that the support strip and the strip lens are adapted to be deformable over a length thereof in an action direction of the first and second set screws and substantially perpendicular to an optical axis,
   wherein the strip lens and the support strip are interconnected indirectly via a spacer strip,
   wherein one longitudinal side of the spacer strip is cohesively connected to the longitudinal side of the strip lens,
   wherein an opposite longitudinal side of the spacer strip is fixedly connected to the longitudinal side of the support strip, and
   wherein the spacer strip has a plurality of slits that are open to the opposite longitudinal side and extend in the action direction of the set screws over an entire width of the spacer strip, as a result of which, a dependence of a flexural strength of the spacer strip is determined by a geometry thereof by a remaining residual thickness of the slit base remaining below the slits.

2. The adjustable lens mount as claimed in claim 1, wherein the support strip has alternate through holes and end-to-end threaded bores arranged in a row, wherein the first set screws engage through the through holes into bores provided with a thread in the mounting plate, and wherein the second set screws butt with pressure against the mounting plate through the threaded bores.

3. The adjustable lens mount as claimed in claim 1, wherein the adjustment spacing is determined by a three-point bearing.

4. The adjustable lens mount as claimed in claim 1, wherein the support strip and the mounting plate are interconnected at their ends via a fixed bearing and a loose bearing.

5. The adjustable lens mount as claimed in claim 1, wherein the mounting plate is adapted to be mountable, for adjustment purposes, directly on a reference surface with at least two degrees of freedom.

6. The adjustable lens mount as claimed in claim 1, wherein the mounting plate is configured to be mounted indirectly onto a reference surface via a base plate, wherein the base plate is configured to be adjusted with two degrees of freedom with respect to the reference surface, and wherein the mounting plate is configured to be adjusted with two further degrees of freedom with respect to the base plate.

7. The adjustable lens mount as claimed in claim 1, wherein the lens mount is configured to different interfaces by varying a thickness of the spacer strip without varying residual thickness.

8. The adjustable lens mount as claimed in claim 1, wherein a width of the spacer strip is less than a height of the strip lens.

9. The adjustable lens mount as claimed in claim 1, wherein a width of the spacer strip decreases from the slit base.

10. The adjustable lens mount as claimed in claim 1, wherein the support strip and the spacer strip are screwed flush to one another on one side.

* * * * *